Patented Apr. 28, 1931

1,802,545

UNITED STATES PATENT OFFICE

GEORGE H. ACKER, OF CLEVELAND, OHIO, ASSIGNOR TO CLEVELAND WORM AND GEAR COMPANY, OF CLEVELAND, OHIO, A CORPORATION OF OHIO

DIFFERENTIAL

Application filed July 8, 1927. Serial No. 204,206.

The invention relates in general to composite wheels, such as are used in machinery, and, more particularly, to a novel and efficient differential construction.

According to the invention, the differential casing may comprise a main casing section and a smaller auxiliary casing section. The main section may be arranged to carry the gear ring and also the means for preventing relative rotation between the gear ring and the casing. The main section may also carry a pinion supporting member such as a cross pin. A unique form of tooth and bolt arrangement may be provided whereby the tooth space is used to accommodate the clamping bolts. A differential made according to the invention is very compact, of small diameter and of great strength. The parts are so arranged as to require a minimum of machining and may be assembled with great facility. The differential according to the invention is especially desirable for use on automobiles having a worm drive rear end, but is not limited to such use.

Various other features and advantages of the invention will be apparent from the following particular description and from an inspection of the accompanying drawings.

Figure 1:
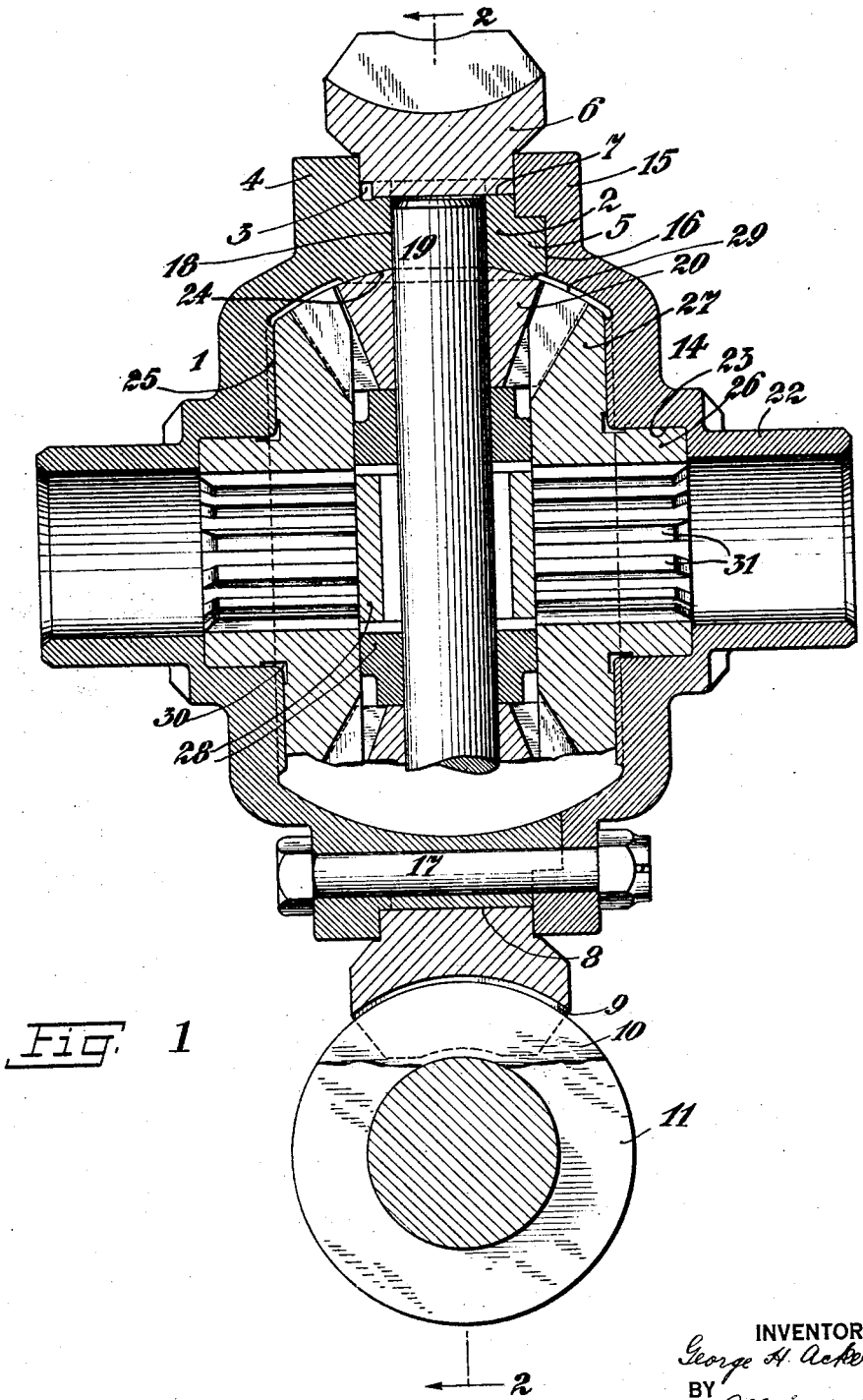
Figure 2:
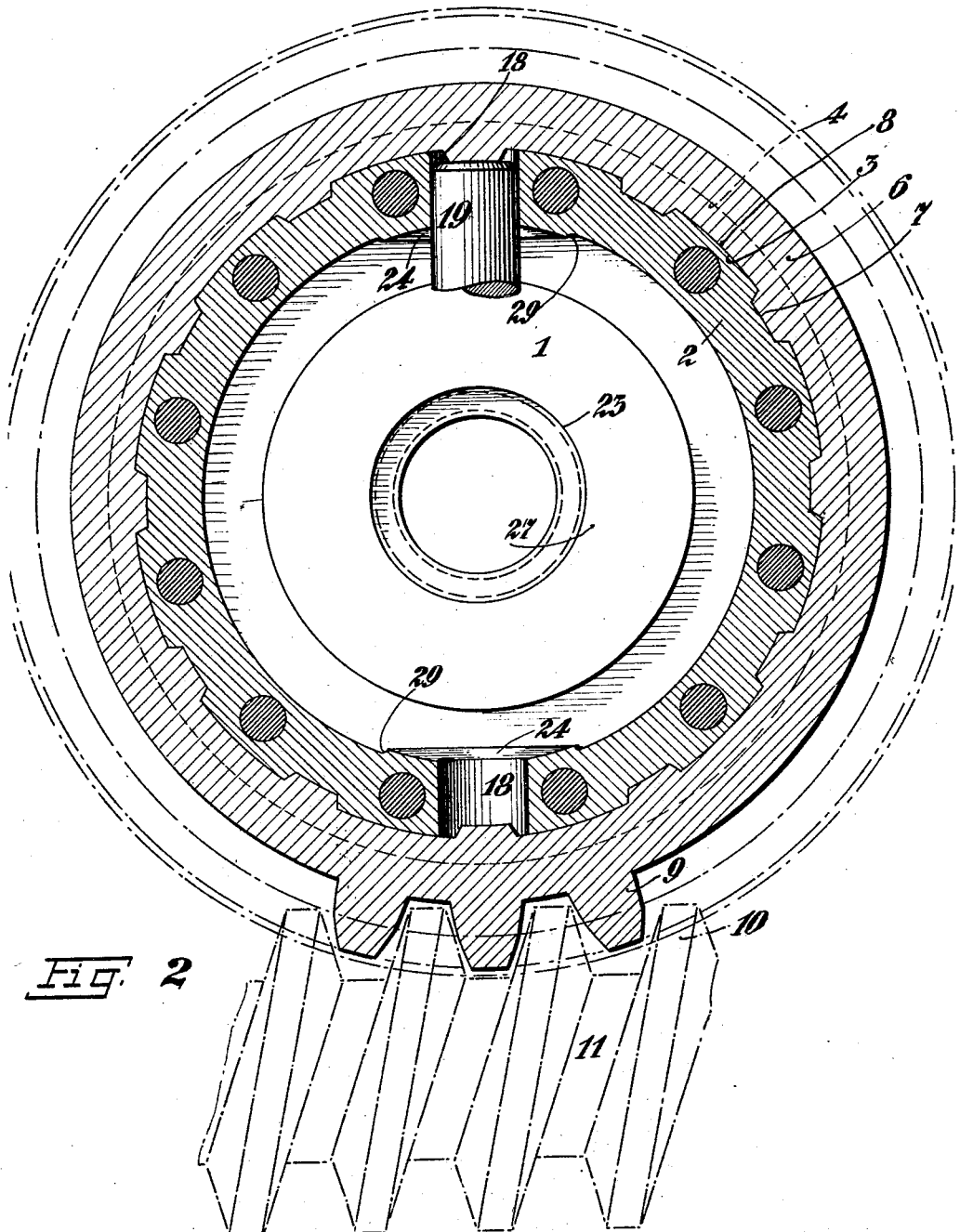

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a longitudinal section of a differential made according to the invention, Fig. 2 is a cross section of Fig. 1 taken on the line 2—2.

Referring now to the drawing, the differential is made up of a main casing secton 1 having an annular drum portion 2 on which is annularly disposed a series of relatively large teeth 3. At one end of the drum portion is an annular outwardly extending radial flange 4, and at the other end of the drum portion is a reduced annular seat 5.

The gear ring 6, which may be made of bronze, comprises an annular internal bore 7 having internal grooves 8 in which the teeth 3 seat. Both the teeth 3 and grooves 8 have non-parallel, non-radial side walls. The outer surface of the gear ring 6 has teeth 9, which as shown, are in the form of worm wheel teeth, the teeth meshing with the teeth 10 of a suitable worm 11.

Co-operating with the main casing section 1 is an auxiliary casing section 14 having a radial flange 15 in which is cut a recess 16 in which the seat 5 fits. Holes are drilled through the casing sections and through the teeth 3 on the main casing section 1, and suitable bolts and nuts 17 are provided to clamp the gear ring 6 between the two radial flanges 4 and 15.

Disposed in the main casing section 1 are diametrically extending holes 18 in which is disposed a cross pin 19. Disposed on the cross pin are a pair of pinions 20. The casing sections have longitudinally extending bearing portions 22 by which the differential is journalled in a suitable housing (not shown) such as the rear end of an automobile as is well understood in the art. The casing sections also have internal recesses 23 in which are disposed tubular hubs 26 of suitable side gears 27, these side gears meshing the pinions 20. Suitable spacing members denoted generally by 28 may be provided to hold the parts in spaced relation, as is well understood in the art.

The main casing 1 is provided with projecting bosses 24 formed wholly therein and having curbed bearing surfaces for the pinions 20. The main casing section 1 and the auxiliary casing section 14 are provided with projecting bosses 25 having bearing surfaces for the side gears 27. The casing sections are provided with suitable clearance spaces 29 to allow clearance for the teeth of the side gears and pinions. Similarly, the side gears are provided with clearance spaces 30 to clear the corners of the casing sections. The side gears 27 are provided with suitable internal splines 31 to engage cooperating grooves on suitable shafts (not shown) forming, for instance, parts of the rear end of an automobile.

Thus it will be seen that a very compact differential construction has been disclosed. The utilization of the tooth space in which to place the clamping bolts serves to reduce the diameter of the differential to a minimum. Furthermore, the provision of teeth on but one of the casing sections and the location of the cross pin in but one of the casing sections, serves to reduce the expense of machining and assembly to a minimum. The construction is such that the entire tooth length is utilized to withstand the stress between the casing and the gear ring, the construction providing maximum strength. At the same time that these advantages are obtained, the advantage of compactness and small diameter so desirable in a worm drive differential construction, is obtained. The construction is comparatively simple and the parts may be made rugged, insuring great strength and freedom from destruction even though subjected to abnormally hard usage. The parts can be made comparatively inexpensively and the labor of machining and assembly is reduced to a minimum.

While certain novel features of the invention have been shown and described and are pointed out in the annexed claims, it will be understood that various omissions, substitutions and changes in the forms and details of the device illustrated may be made by those skilled in the art without departing from the spirit of the invention.

What is claimed is:

1. A differential comprising a main casing section having an annular drum portion, said drum portion having radial seats, said drum portion also having locking teeth on its outer surface, a gear ring having an internal bore extending substantially the length of said drum portion, said bore having grooves receiving said locking teeth, said drum portion having a radial annular flange at one side, an auxiliary casing section having a radial flange, fastening members passing through said teeth and said auxiliary casing section to hold said gear ring between said flanges, and a pinion supporting member seated in said seats.

2. A differential comprising a main casing section having an annular drum portion, said drum portion having diametrically opposed radial holes, said drum portion also having locking teeth on its outer surface, a gear ring having an internal bore, said bore having grooves receiving said locking teeth, said teeth and grooves extending substantially the width of said drum portion, an auxiliary casing section, means for holding the parts in assembled relation including fastening members passing through said teeth, a cross pin seated in said holes and pinions on said cross pin.

3. A differential comprising a main casing section having an annular drum portion, said drum portion having diametrically opposed radial holes, said drum portion also having relatively large locking teeth on its outer surface, a gear ring having worm wheel teeth and an internal bore extending substantially the length of said drum portion, said bore having grooves receiving said locking teeth, said drum portion having a radial annular flange at one side and a reduced annular seat on the other side, an auxiliary casing section having a recess fitting said seat and a radial flange, fastening members passing through said teeth and said auxiliary casing section to hold said gear ring between said flanges, a cross pin seated in said holes, pinions on said cross pin, and side gears journalled in said sections and meshing said pinions.

4. A composite wheel comprising a main casing section having a drum portion, said drum portion having comparatively large, annularly disposed teeth extending the length of said drum portion, said gear ring having a bore fitting said drum portion, said bore having grooves fitting said teeth, an auxiliary casing section, and means for holding said parts in assembled relation including bolt members passing through said teeth.

5. A composite wheel comprising a main casing section having a drum portion and a radial annular flange, said drum portion having comparatively large, annularly disposed teeth extending the length of said drum portion, a gear ring having a bore fitting said drum portion, said bore having grooves fitting said teeth, an auxiliary casing section having a radial annular flange, and bolt means passing through said teeth and said auxiliary section to clamp said gear ring between said flanges.

6. A composite wheel comprising a main casing section having a drum portion and a radial annular flange, said drum portion having comparatively large, annularly disposed teeth extending the length of said drum portion, a gear ring having a bore fitting said drum portion, said bore having grooves fitting said teeth, an auxiliary casing section having a radial annular flange, and bolt means for clamping said gear ring between said flanges.

7. A differential comprising a main casing section having a drum portion and an annular flange on one side thereof, a gear ring having a bore fitting on said drum portion, said gear ring and drum portion having interfitting teeth so that all the rotative stress is transmitted through said drum portion, said bore, drum portion and interfitting teeth extending substantially the same axial extent, an auxiliary casing section centered on said main casing section and having an annular flange on the other side of said drum portion from said first flange, side gears, means for mounting said gears one in each casing section, a pinion engaging said gears, and means for supporting said pinion by said drum portion.

8. In a differential construction of the character described, the combination of a casing element provided with a plurality of circumferential, radial tongues of substantial dimensions, a one-piece ring gear element provided in its eye with a plurality of internal radial spaced tongues interfitting with the said tongues of the casing, the sides of said tongues respectively lying in the same plane, annular elements adapted to hold the said interfitting tongues against relative lateral displacement, and tie-bolts extending through the said annular elements and certain of said tongues.

9. In a differential construction of the character described, the combination of a casing element provided with a plurality of circumferential, radial tongues of substantial dimension, a one-piece ring gear element provided in its eye with a plurality of internal radial spaced tongues interfitting with the said tongues of the casing, the sides of said tongues respectively lying in the same plane, means for holding the said interfitting tongues against relative lateral displacement, the sides of the ring gear element projecting beyond the tongues thereof to provide annular recesses in which said means are located, and tie-bolts extending through the said means and certain of said tongues.

10. In a differential construction of the character described, the combination of a casing element provided with a plurality of circumferential, radial tongues of substantial dimensions, a one-piece ring gear element provided in its eye with a plurality of internal radial spaced tongues, interfitting with the said tongues of the casing, the sides of said tongues respectively lying in the same plane, annular elements adapted to hold the said interfitting tongues against relative lateral displacement, the sides of the ring gear element projecting beyond the tongues thereof to provide annular recesses in which said annular elements are located, and tie-bolts extending through the said annular elements and certain of said tongues.

11. In a differential construction of the character described, the combination of a casing element provided with a plurality of circumferential, radial tongues of substantial dimensions, a one-piece ring gear element provided in its eye with a plurality of internal radial spaced tongues interfitting with the said tongues of the casing, the sides of said tongues respectively lying in the same plane, annular elements incorporated with one of the first mentioned elements adapted to hold the said interfitting tongues against relative lateral displacement, the sides of the ring gear element projecting beyond the tongues thereof to provide annular recesses in which said annular elements are located, and tie-bolts extending through the said annular elements and certain of said tongues.

12. A differential comprising a casing, gear mechanism within said casing, a gear ring surrounding said casing, interfitting elements integral with said gear ring and casing respectively to take rotational stress therebetween, and means including bolt members passing through the annular zone occupied by said interfitting elements to hold said gear ring and casing assembled.

13. A differential comprising a first casing section having a plurality of circularly arranged, spaced teeth, a gear ring having grooves fitting said teeth, a second casing section, gear mechanism within said casing sections, and means for holding said parts in assembled relation including bolt members passing through said teeth.

14. A differential comprising an inner section having a plurality of circularly arranged, spaced tongues, a gear ring surrounding said inner section and having tongues interfitting said first tongues, means for holding said parts in assembled relation including bolt members passing through certain of said tongues.

15. A differential comprising a set of casing sections forming a housing, each of said casing sections having an outer, radial annular flange, one of said casing sections having a plurality of circularly arranged, spaced tongues, a gear ring having a plurality of circularly arranged, spaced tongues interfitting said first tongues, said gear ring being disposed between said flanges, and bolt members passing through said flanges and through certain of said tongues to hold the parts in assembled relation.

In testimony whereof I have hereunto set my hand.

GEORGE H. ACKER.